United States Patent [19]

Suzuki et al.

[11] Patent Number: 5,091,263
[45] Date of Patent: Feb. 25, 1992

[54] COATED POLYNORBORNENE PRODUCTS

[75] Inventors: Shoji Suzuki, Yokohama; Motoyuki Yamato, Kanagawa, both of Japan

[73] Assignee: Nippon Zeon Co., Ltd., Tokyo, Japan

[21] Appl. No.: 402,286

[22] Filed: Sep. 5, 1989

[51] Int. Cl.$^5$ .............................................. B32B 27/08
[52] U.S. Cl. ................................... 428/518; 428/336; 428/411.1; 428/516; 428/517; 428/520
[58] Field of Search ............ 428/518, 516, 517, 411.1, 428/520, 336

[56] References Cited

U.S. PATENT DOCUMENTS

| | | | |
|---|---|---|---|
| 4,339,502 | 7/1982 | Gerry et al. | 428/411 |
| 4,382,115 | 5/1983 | Takahashi | 428/424.6 |
| 4,540,632 | 9/1985 | Finn | 428/422 |
| 4,710,408 | 12/1987 | Kraus | 427/393.5 |
| 4,800,130 | 1/1989 | Yonekura et al. | 428/517 |
| 4,923,734 | 5/1990 | Benedikt | 428/209 |

FOREIGN PATENT DOCUMENTS

0360068A1 3/1990 European Pat. Off. .
3102933 9/1978 Japan .

*Primary Examiner*—Merrell C. Cashion, Jr.
*Assistant Examiner*—D. S. Nakarani
*Attorney, Agent, or Firm*—Thoburn T. Dunlap; George A. Kap

[57] ABSTRACT

A product is disclosed which comprises a ring-opened base polymer of at least one norbornene-type monomer and a thin polymer film on at least a portion of said base polymer of a vinylidene chloride polymer or an unsaturated nitrile polymer whereby the product has improved weatherability and reduced odor. The method of making the product is characterized by applying the polymer film from an organic solution of a vinylidene chloride resin or an unsaturated nitrile resin and then drying the coating to remove the organic solvent.

9 Claims, No Drawings

COATED POLYNORBORNENE PRODUCTS

BACKGROUND OF THE INVENTION

This invention pertains to a polynorbornene type molded product having a film of vinylidene chloride type resin and/or unsaturated nitrile type resin thereon and to the method of making it. More specifically, the invention herein pertains to a polynorbornene molded product and method of its manufacture in which the odor characteristic of the norbornene type monomer's ring-opened polymer is curbed and the product has excellent lustre and weather resistance.

By ring-opening polymerization of a norbornene type monomer within a mold by means of the reaction injection molding (RIM) method it is possible to obtain ring-opened polymers with mechanical strength, heat resistance, and water resistance, etc. However, when the ring-opened polymer of the norbornene type monomer is used, the unreacted monomer often tends to remain within the final molded product. For that reason, a distinct odor is emitted. Therefore, the prior art product is generally not used in an environment where the odor becomes a problem, such as in a closed room. Also, the color of the prior art polynorbornene type molded product is usually yellow or brown. Even when dyes are added, the color tone tends to change as the time passes.

In the past, in order to improve the surface condition of the polynorbornene type molded product, methods have been proposed in which paint was applied, as in the disclosure Japanese KOKAI 63-23971, or colored plastic sheets or printed sheets were laminated to the polymer product. In spite of the many different ways that were tried, it was difficult to curb the distinct odor. Problems with the tried systems abounded. For instance, with water-soluble paints, there was a problem in that the painted film could not be formed easily. On the other hand, in the case of plastic sheets, since many adhere poorly to the polynorbornene type molded product, it was difficult to obtain practical composite materials.

It was discovered earlier that by providing a layer of a film or sheet of an olefin type polymer or hydrocarbon type thermoplastic elastomer on the surface of the base material made of polynorbornene, it was possible to obtain a composite material with good surface adhesion, improved surface conditions, and curbed odor. The inventors submitted a patent application, identified as Japanese Application No. 63-171038. However, their advances were still insufficient in terms of prevention of odor.

SUMMARY OF THE INVENTION

This invention makes it possible to provide a polynorbornene type molded product which is characterized by the fact that it is made by forming a polymer film (B) of a film-forming polymer selected from vinylidene chloride type resin and/or unsaturated nitrile type resin on the surface of the base material (A) made of the norbornene type monomer's ring-opened polymer. Also, this invention provides a method of manufacturing a polynorbornene type molded product which is characterized by the fact that it is made by forming a film (B) of vinylidene chloride type resin and/or unsaturated nitrile type resin and applying the film-forming resin from an organic solvent solution on the surface of the base material (A) made of the norbornene type monomer's ring-opened polymer.

DETAILED DESCRIPTION OF INVENTION

In this invention, the monomer that is used as the raw material for the ring-opened polymer which is to become the base material (A) is a multi-ring norbornene type monomer with at least two or three rings. When the one with more than three rings is used, it is possible to obtain a polymer with a high heat deformation temperature; therefore, it can have the heat resistance that is required as a composite material.

Also, in this invention, it is possible to make the polymer a thermosetting type. In order to do this, at least 10 weight percent, or preferably at least 30 weight percent, of crosslinking monomer per 100 weight percent monomer can be used.

Examples of bicyclic norbornene type monomers are norbornene and alkyl norbornenes containing 1–6 carbons, preferably 1–3, in the alkyl group. Specific examples of bicyclic norbornene type monomers include 2-norbornene, 5-methyl-2-norbornene, alkylidene norbornenes containing 2 to 4 carbon atoms such as 5-ethylidene-2-norbornene, and 5-phenylnorbornene. Examples of norbornene-type monomers include tricyclic norbornene type monomers such as dicyclopentadiene and dihydrodicyclopentadiene; tetracyclic monomers such as tetracyclododecene; pentacyclic monomers such as tricyclopentadiene; tetracyclopentadiene as well as alkyl substitutes of the above such as methyl, ethyl, propyl, or butyl; alkylidene substitutes such as ethylene; and aryl substitutes such as phenyl.

In terms of the ease of handling, reactivity, and heat resistance, the tricyclic, tetracyclic and pentacyclic monomers are used most effectively.

The crosslinking monomers are multi-ring norbornene type monomers which have more than two double bonds. Examples of the crosslinking monomers include dicyclopentadiene, tricyclopentadiene and tetracyclopentadiene. Therefore, the norbornene type monomer and the crosslinking monomer can be identical, in which case, no separate crosslinking monomer is needed.

These norbornene type monomers can be used by themselves, or more than two of them can be mixed.

The norbornene type monomers of tricyclic type or more can also be obtained by heat-processing or heat treatment of dicyclopentadienes. The conditions for this heat processing are such that dicyclopentadiene is heated in an inactive gas atmosphere at 120° to 250° C. for 0.5 to 20 hours, preferably with an antioxidant. By this heat processing, a monomer mixture of pentacyclopentadecadiene (cyclopentadiene trimer) and unreacted dicyclopentadiene can be obtained.

In addition, it is possible to use cyclobutene, cyclopentene, cyclopentadiene, cyclooctene, and cyclododecene, along with at least one of the aforementioned norbornene type monomers, without impairing the purpose of this invention.

The metathesis catalyst system suitable herein for polymerizing at least one polynorbornene-type monomer includes a catalyst and an activator or cocatalyst. The catalyst to be used can be any metathesis catalyst known as the ring-opening polymerization catalyst for the norbornene type monomer, as disclosed in the following publications. Japanese KOKAI 58-127728, 58-129013, 59-51911, 60-79035, 60-1865611, and 61-126115.

Examples of a metathesis catalyst include: halide compounds of metals such as tungsten, molybdenum, and tantalum; and oxides and organic ammonium salts of such metals. Examples of the activating agents or cocatalysts include alkyl aluminum halides, alkoxyalkyl aluminum halides, and organic tin compounds.

The metathesis catalyst is used in the amount of 0.01-50 millimoles, or preferably 0.1-10 millimoles, per 1 moles of the norbornene type monomer. The activating agent is used in the molar ratio of 2 to 10 moles per mole of the catalyst component.

The metathesis catalyst and the activating agent should be dissolved in the monomer when they are used; however, as long as they do not impair the quality of the molded product, they can be suspended or dissolved in a small amount of a dissolving agent.

The base material (A) to be used in this invention is made of an ring-opened polymer that is obtained by ring-opening polymerization of the norbornene type monomer in bulk. It does not appear to matter if a small amount of inactive dissolving agent remains in the product.

In a preferred manufacturing method of the ring-opened polymer, the norbornene type monomer is divided into two portions and put into separate containers. The metathesis catalyst is put into one container and an activating agent is added to the other. This way, two stable reaction solutions are prepared. These two types of reaction solutions are mixed and then the mixture is conveyed into a mold or a frame where ring-opening polymerization in mass takes place.

In this invention, the conventional impingement mixing device can be used to mix the two kinds of reaction solutions. In this case, the container storing the two reaction solutions becomes a source for feeding to two separate flow streams. The two kinds of flow streams are mixed instantaneously by the mixing head of the RIM machine and then the mixture is conveyed into the heated mold, where mass polymerization takes place immediately.

When the pot life at a high temperature is as long as one hour, it is possible to inject the mixture in one or several shots into the mold which was previously heated, after completing the mixing of the two streams. This is disclosed by Japanese KOKAI 59-51911 and U.S. Pat. No. 4,426,502. In this manner, it is possible to make the device smaller than the conventional impingement mixing device and it also makes it possible to operate under a low pressure.

Also, this invention is not limited to the case in which two kinds of solutions or streams are used. As anyone with expertise in this field would easily understand, many variations are possible, such as adding a reaction solution and an additive to a third container to make a third flow stream, etc.

The temperature of the mold should be more than 30° C., preferably 40°-200° C. and more preferably 50 −130° C. The mold pressure should be within the range of 0.1-100 kg/cm$^2$.

The polymerization time can be selected according to needs; however, it is usually less than 20 minutes, preferably less than 5 minutes. The polymerization time, however, can be longer.

The components to be used in the polymerization reaction can be stored and operated in an inert gas atmosphere, such as nitrogen gas. The mold can be sealed by an inert gas, but it is not absolutely necessary.

The molded product of this invention can be improved by fillers, reinforcing materials, foaming agents, antioxidants, paints, coloring agents, elastomers, dicyclopentadiene type heat polymerization resins, and the like.

The additives should be mixed with one or both of the original reaction solutions, or they can be placed directly into the mold.

As the fillers, there are inorganic fillers such as crushed glass fiber, carbon black, talc, calcium carbonate, and mica. As the reinforcing materials, glass fibers and carbon fibers are available.

When the base material is to be foamed, a foaming agent is added to the original solution before pouring into the mold. Preferred foaming agents are organic compounds with a low boiling point which is normally in the liquid form and evaporates easily. Examples include hydrocarbons such as pentane and hexane; hydrocarbon halides such as methylene chloride, trichloroforo-methane, and dichlorodifuruoromethane; and inactive gases such as nitrogen or argon.

As examples of elastomers, included are natural rubber, polybutadiene, polyisoprene, styrene-butadiene copolymer (SBR), styrene-butadiene-styrene block copolymer (SBS), styrene-isoprene-styrene block copolymer (SIS), ethylene-propylene-diene polymer (EPDM), ethylene vinyl acetate copolymer (EVA), and hydrogenated products of the above.

The vinylidene chloride type resin to be used as a component to form film (B) in this invention is a homopolymer made of polyvinylidene chloride or a copolymer with vinylidene chloride as main component along with at least one other vinyl monomer as a comonomer. The vinylidene type resins suitable herein contain at least a major proportion of vinylidene chloride in polymerized form, exceeding 60% thereof.

Examples of other vinyl monomers include acrylic or methacrylic monomers such as acrylonitrile, methacrylonitrile, acrylic acid, methacrylic acid, methyl acrylate, ethyl acrylate, propyl acrylate, butyl acrylate, hexyl acrylate, octyl acrylate, cyclohexyl acrylate, glycidyl acrylate, monoglyceride acrylate, phenyl acrylate, acrylamide, methacrylamide, methyl methacrylate, amyl methacrylate, glycidyl methacrylate, monoglyceride methacrylate; vinyl aromatic monomers such as styrene and vinyl toluene; vinyl ester type monomers such as vinyl acetate and vinyl prop ionate; diolefin type monomers such as butadiene and isoprene; methyl vinyl ether, glycidylallyl ether, vinyl chloride, vinyl trichloride, ethylene tetrachloride, vinyl fluoride, vinylidene fluoride, ethylene trifluoride, ethylene tetrafluoride, anhydrous maleic acid, fumatic acid, vinyl succinate imide, and vinylpyrrolidone. These monomers are used by themselves, or more than two of them can be mixed together.

Among the vinylidene chloride type resins, the most desirable in terms of adhesion to the base material and the deodorizing effect are the copolymers which contain 99-70% by weight, preferably 96-80% by weight, of vinylidene chloride, and 1-30% by weight, preferably 4-20% by weight, of acrylic or methacrylic monomer, along with other vinyl monomers, if needed.

Examples of preferred vinylidene chloride copolymers include vinylidene chloride/acrylonitrile copolymer, vinylidene chloride/acrylonitrile/methacrylonitrile copolymer, vinylidene chloride/acrylonitrile/methyl acrylate/glycidyl methacrylate copolymer, and vinylidene chloride/acrylonitrile/styrene copolymer.

The unsaturated nitrile type resins to be used in this invention are copolymers with an unsaturated nitrile type monomer such as acrylonitrile or methacrylonitrile as the main component copolymerized with vinyl monomers such as alkylester acrylate or alkylester containing methacrylate, 1-20 carbons in each alkyl group, or a mixture of said monomers copolymerized in the presence of rubber type polymers. The unsaturated nitrile type resins suitable herein contain at least a major proportion of the nitrile in polymerized form, exceeding 60% thereof. The nitrile is preferably acrylonitrile or methacrylonitrile, especially acrylonitrile.

Examples of alkylester acrylates or alkylester methacrylates include methyl acrylate, ethyl acrylate, propyl acrylate, butyl acrylate, methyl methacrylate, ethyl methacrylate, propyl methacrylate, butyl methacrylate, lauryl methacrylate, tridecyl methacrylate, myristyl methacrylate, cetyl methacrylate, stearyl methacrylate, and methyl alpha-chloracrylate.

It is also possible to use olefin type monomers such as styrene, vinyl chloride, vinyl fluoride, vinylidene chloride, and isobutylene as comonomers for making the unsaturated nitrile resin.

Examples of rubber type polymers include diene type rubbers such as polybutadiene, polyisoprene, acrylonitrile-butadiene copolymer rubber, acrylonitrile-butadiene-isoprene copolymer rubber; and copolymer rubber of diene and alkylester acrylate such as acrylonitrile-butadiene-isoprene copolymerized rubber.

Examples of the organic solvent for the vinylidene chloride type resins and/or unsaturated nitrile type resins include protic, aprotic, aliphatic and cyclic hydrocarbon, cyclic oxyhydrocarbon, and halogenated or chlorinated aliphatic hydrocarbon solvents. Solvents like water and alcohols are protic solvents which contain a hydrogen attached to oxygen or nitrogen and hence, are appreciably acidic. Dimethyl sulfoxide, dimethyl formamide, and sulfolane are aprotic solvents which are polar with moderately high dielectric constants and which are devoid of acidic hydrogen. Also suitable herein are benzene-type solvents containing a benzene group such as toluene, cyclic ether solvents containing 1-2 oxygen atoms and 3-6 carbons such as tetrahydrofuran and dioxane, alkyl ester solvents containing 1-6 carbons in the alkyl group such as ethyl acetate, dimethylsulfoxide, dialkyl ketone solvents containing 1-6 carbons in each alkyl group such as methylethylketone, dimethylformamide, cycloaliphatic solvents containing 4-8 carbons such as cyclohexane, and halogenated alkane solvents of 1-6 carbons such as 1,1,1-trichloroethane. They are used as a solution with the solid component's concentration of 0.1 to 60 weight percent, or more preferably 1 to 10 weight percent.

The organic solvent solution does not have to be a solution in which vinylidene chloride resins and/or unsaturated nitrile type resins are dissolved completely. It can be a solution in which some solid parts are dispersed. A vinylidene chloride type resin and an unsaturated nitrile type resin can be used singly or they can be combined at a desired ratio using a common solvent. If resins other than vinylidene chloride type resin and/or unsaturated nitrile type resin are used, the adhesion with said ring-opened polymer is not sufficient and the deodorizing effect is, likewise, insufficient. Also, when these resins are applied as a water dispersion solution of, for instance, latex, instead of an organic solvent solution, a satisfactory film is not obtained. Only by using the composition specified by this invention is it possible to obtain a film that shows excellent adhesion to the base material along with deodorizing effect, weather resistance, and excellent luster.

To the organic solvent solution ingredients can be added such as paints, stabilizers, or other vehicles such as alkyd resins, acrylic resins, polyesters, polyethanes, and epoxy resins.

In this invention, as already noted, it is necessary to apply vinylidene type resin and/or unsaturated nitrile type resin as an organic solvent solution. If a dispersion solution using water solvent such as latex is applied, a film cannot be formed since the surface of the ring-opened polymer base material repels the dispersion solution.

To apply the organic solvent solution, any of the conventional methods can be used such as the brushing method, the spraying method, the immersion method, the bar-coat method, the roll coated method, and the spin coated method. The solution can be applied once or several times.

Before application, the surface of the base material should be washed with an organic solvent such as acetone, or the surface can be made rough.

After application, the organic solvent is dried and eliminated at ambient temperature or by heat. Then a film is formed. Examples of the drying method are natural drying, drying by means of a carrier gas, or heat drying in a hot-air oven or an infrared ray oven. In general, when heating to 80-150° C. for 5-30 minutes, it is possible to obtain a film with uniformity and good adhesion.

There is no restriction on the thickness of the film as long as a uniform thickness can be obtained. Generally, however, the thickness range of 1-50 millimicrons ($\mu$m), preferably 3-40 $\mu$m, is desirable. When the film is too thin, pin holes will be generated and the deodorizing effect is impaired. If, on the other hand, the film is too thick, cracks will appear through contraction at the time of drying, which impedes the formation of a uniform film.

In the molded product of this invention, the base material made of the norbornene type monomer's ring-opened polymer (A) and film of vinylidene chloride and/or unsaturated nitrile type resin (B) strongly adhere to each other at their surfaces. Furthermore, the surface condition of the coated polynorbornene is very good. The shape of the molded product can be a sheet, cylinder, tube, or any other desired shape. Even if the shape is complicated, it is possible to cover the entire surface since the film forming resin is applied as an organic solvent solution. Needless to say, depending on the shape or the purpose of the molded product, it is possible to cover only part of the surface of the product with the film.

By providing this film, the distinct odor of the polynorbornene type molded product can be effectively shut off. This film also has excellent lustre and transparency. The film improves the weather resistance of the base material as well. In this invention, the coating layer is usually used as the top layer; however, depending on the purpose of use, it is possible to place a coating layer of other resins above it.

Since the molded product of this invention uses a ring-opened polymer of the norbornene type monomer as a base material, it has excellent mechanical strength and heat resistance. Moreover, it has good dimensional stability due to the fact that the base material does not absorb much water. The specific gravity of the base material is less than 1.1, which is very low among plastics. Furthermore, since the reaction injection molding method is used, it is easy to make large molded products.

As such, the molded product of this invention exhibits excellent quality through the combination of the physical properties of the base material and those of the film. Moreover, since the odor is eliminated, it is suited for indoor uses.

In the following examples, this invention is illustrated in detail using application examples and comparative examples; however, this invention is not limited only to these application examples. "Parts" and "percent" in the examples are weight parts and weight percent, unless otherwise indicated.

EXAMPLE 1

Two percent of phenol antioxidant, Irganox 259 (made by Chibagaiki, K.K.), was dissolved in dicyclopentadiene (DCP), which was poured into two containers. In one of them, diethyl aluminum chloride (DEAC), n-propanol, and silica tetrachloride were added to DCP in such a way that their concentration was 33 millimoles, 42.9 millimoles, and 20 millimoles, respectively. In the other container, tri(tridecyl) ammonium molybdate was added to DCP in such a way that its concentration was 4 millimoles.

Both reaction solutions were mixed at a ratio of 1:1 and the mixture was poured into a 20 cm × 20 cm × 0.4 cm mold which was heated to 80° C. Ring-opening polymerization reaction in the mold was conducted for approximately 3 minutes and then, a panel-shaped base material of poly-DCP was obtained. All of these operations were conducted in the nitrogen gas atmosphere.

The surface of the panel-shaped base material that was obtained as above was washed with acetone. Then, a vinylidene type resin solution in tetrahydrofuran solvent at a concentration of 5% was applied with a brush to the panel-shaped base material. The vinylidene type resin was composed of 90% vinylidene chloride, 5% acrylonitrile, and 5% methacrylonitrile. After drying at the ambient temperature, the material was heated to 120° C. for ten minutes. Thus, a film of 10–15 μm thickness was formed on the surface of the base polymeric material.

The film was transparent and the molded product retained the base material's original appearance.

The adhesion of the film was tested by the JIS K4500 grid test pursuant to which one hundred grids of 1 mm square were made on the film with a cutter. All over the grids, peeling tapes were attached and the tapes were peeled off later. Then, the number of grids that came off was counted. Only 10 grids out of 100, or 10/100, were peeled off, which indicated good adhesion.

Also, a test was conducted for the film's effect of shutting off the odor, using five subjects. Three persons did not perceive the distinct odor of the base material at all whereas two persons did. This is an indication of effective reduction of the odor emitted by the base material.

EXAMPLE 2

The surface of the panel-shaped base material that was obtained in Example 1 was washed with acetone and then, the entire surface of this base material was brushed with a dimethylformamide solution of Barrex 1000S polyacrylonitrile resin (made by Mitsui Toatsu Kagaku K.K.). The resulting product was dried at ambient temperature and then it was heated to 150° C. for 5 minutes. Thus, a film of polyacrylonitrile resin was formed on the surface of the base material.

The film was transparent and the distinct odor of the base material was not perceived. The adhesion of the film was tested in the same manner as in Example 1. The number of grids that were peeled off was 7 out of 100, which indicated good adhesion.

COMPARATIVE EXAMPLE 1

The base material that was obtained in Example 1 was immersed in vinylidene chloride type latex (Kureharon DO made by Kureha Chemical Industry Co. Ltd.) having solids concentration of 45%. In the latex, the dispersant was water, the emulsifier was polyvinyl alcohol, and the polymer consisted of 90% vinylidene chloride and 10% of acrylonitrile. However, the latex began to peel off from the surface of the base material and the latex film could not be formed.

EXAMPLE 3

On the entire surface of the base material that was obtained in Example 1, a 5% dimethylformamide solution of a polymer was applied using a brush. The polymer consisted of 74% acrylonitrile, 21% methyl acrylate, and 5% lauryl methacrylate. After drying at the ambient temperature, it was heated to 150° C. for 5 minutes.

The film that was obtained was transparent and showed excellent adhesion to the base material. The result of the grid test showed that the number of peeled-off grids were 8 out of 100.

The result of odor tests employing five subjects resulted in three persons who did not perceive the odor and two who did.

We claim:

1. A polynorbornene article having improved weatherability, luster, and reduced odor emittance comprising a ring-opened norbornene base polymer having on at least a portion of its surface an adherent film-forming, solvent born coating selected from the group consisting of vinylidene chloride polymers containing at least a major proportion of vinylidene chloride, unsaturated nitrile polymers containing at least a major proportion of a nitrile, and mixtures thereof, wherein said base polymer is polymerized from at least one norbornene monomer via ring-opening bulk polymerization in a mold.

2. The article of claim 1 wherein said norbornene monomer is selected from the group consisting of norbornene and alkyl substituted norbornenes containing 1–6 carbon atoms in each alkyl group, alkylidene norbornenes containing 2–4 carbon atoms in each alkylidene group; tricyclic norbornene type monomers, tetracyclic norbornene monomers, pentacyclic monomers, and mixtures thereof.

3. The article of claim 1 wherein said norbornene monomer is selected from the group consisting of norbornene and alkyl norbornenes containing 1 to 2 alkyl groups of 1 to 3 carbon atoms in each alkyl group, ethylidene norbornene, vinyl norbornene, dicyclopentadiene, tetracyclododecene and alkyl tetracyclododecenes containing 1 to 2 alkyl groups of 1 to 3 carbon atoms in each alkyl group, and mixtures thereof.

4. The article of claim 3 wherein said film forming polymer film is selected from the group consisting of vinylidene chloride polymers containing 70%–90% by weight vinylidene chloride and 30%–1% by weight of at least one vinyl comonomer; unsaturated nitrile polymers containing at least 60% by weight nitrile and up to 40% by weight of at least one vinyl monomer selected from the group consisting of alkylester acrylates, alkylester methacrylates, and mixtures thereof, copolymerized in a rubber type polymer containing 1-20 carbon atoms in each alkyl group; and mixtures thereof.

5. The article of claim 4 wherein said film forming polymer film is selected from the group consisting of copolymers of vinylidene chloride and acrylonitrile; copolymers of vinylidene chloride, acrylonitrile, and methacrylonitrile; copolymers of vinylidene chloride, acrylonitrile, methyl acrylate and glycidyl methacrylate; copolymers of vinylidene chloride, acrylonitrile, and styrene; copolymers of acrylonitrile and at least one alkylester acrylate or methacrylate containing 1-20 carbon atoms in each alkyl group.

6. The article of claim 3 wherein said film forming polymer film is selected from copolymers of vinylidene chloride and acrylonitrile; copolymers of vinylidene chloride, acrylonitrile, methyl acrylate, and glycidyl methacrylate; copolymers of vinylidene chloride, acrylonitrile, and styrene; and mixtures thereof.

7. The article of claim 3 wherein said film forming polymer film is selected from the group consisting of unsaturated nitrile resins polymerized with at least one vinyl monomer in the presence of a rubber type polymer, wherein said nitrile resin is selected from the group consisting of acrylonitrile, methacrylonitrile, and mixtures thereof; said vinyl monomer is selected form the group consisting of alkyl ester acrylates, alkylester methacrylates, and mixtures thereof, wherein said alkyl group contains 1 to 20 carbons; and wherein rubber type polymer is selected from the group consisting of polybutadiene, polyisoprene, acrylonitrile-butadiene copolymers, acrylonitrile-butadieneisoprene copolymers, and mixtures thereof.

8. The article of claim 6 wherein thickness of said film forming polymer film is in the range of 1-50 millimicrons, said polymer film has good adhesion to said ring opened base polymer, and said product has reduced odor of the norbornene type monomer(s).

9. The article of claim 6 wherein said norbornene monomer is selected from the group consisting of norbornene, methyl norbornene, ethylidene norbornene, dicyclopentadiene, tetracyclododecene, methyl tetracyclododecene, reaction products of heat treated dicyclopentadiene, and mixtures thereof; and said product has no perceived odor, as perceived by human sense of smell.

* * * * *

UNITED STATES PATENT AND TRADEMARK OFFICE
CERTIFICATE OF CORRECTION

PATENT NO. : 5,091,263
DATED : February 25, 1992
INVENTOR(S) : Shoji Suzuki and Motoyuki Yamato It is certified that error appears in the above-identified patent and that said Letters Patent is hereby corrected as shown below:

Column 8, line 67, "70% to 90%" should read --70% to 99%--.

Column 9, line 19, insert the phrase --the group consisting of-- after "from".

Column 10, line 4, "form" should read --from--.

Column 10, line 10 "acrylonitrile-butadieneisoprene" should read --acrylonitrile-butadiene-isoprene--.

Signed and Sealed this

Seventeenth Day of August, 1993

Attest:

BRUCE LEHMAN

Attesting Officer     Commissioner of Patents and Trademarks